United States Patent
Hall

(10) Patent No.: US 12,478,834 B2
(45) Date of Patent: Nov. 25, 2025

(54) SENSOR FUSION SYSTEM FOR TRACKING PERSONS AND OBJECTS

(71) Applicant: SportsMEDIA Technology Corporation, Durham, NC (US)

(72) Inventor: Gerard J. Hall, Durham, NC (US)

(73) Assignee: SportsMEDIA Technology Corporation, Durham, NC (US)

(*) Notice: Subject to any disclaimer, the term of this patent is extended or adjusted under 35 U.S.C. 154(b) by 344 days.

(21) Appl. No.: 18/109,623

(22) Filed: Feb. 14, 2023

(65) Prior Publication Data

US 2024/0269509 A1    Aug. 15, 2024

(51) Int. Cl.

| | |
|---|---|
| *G01S 17/89* | (2020.01) |
| *A63B 24/00* | (2006.01) |
| *G06T 7/20* | (2017.01) |
| *G06T 7/70* | (2017.01) |
| *G06T 11/00* | (2006.01) |
| *A63B 102/24* | (2015.01) |

(52) U.S. Cl.
CPC .......... *A63B 24/0021* (2013.01); *G01S 17/89* (2013.01); *G06T 7/20* (2013.01); *G06T 7/70* (2017.01); *G06T 11/00* (2013.01); *A63B 2024/0025* (2013.01); *A63B 2024/0028* (2013.01); *A63B 2102/24* (2015.10); *A63B 2220/16* (2013.01); *A63B 2220/806* (2013.01); *A63B 2220/89* (2013.01); *G06T 2207/30224* (2013.01)

(58) Field of Classification Search
CPC ................ A63B 24/0021; A63B 24/00; A63B 2024/0025; A63B 2024/0028; A63B 2102/24; A63B 2220/16; A63B 2220/806; A63B 2220/89; G01S 17/89; G01S 17/88; G01S 17/00; G06T 7/20; G06T 7/00; G06T 7/70; G06T 11/00; G06T 2207/30224

See application file for complete search history.

(56) References Cited

U.S. PATENT DOCUMENTS

| | | |
|---|---|---|
| 9,734,405 B2 | 8/2017 | Marty et al. |
| 10,754,025 B2 | 8/2020 | Asghar et al. |
| 10,922,871 B2 | 2/2021 | Xue et al. |
| 10,989,519 B2 | 4/2021 | Labbe et al. |
| 10,994,172 B2 | 5/2021 | Hall |

(Continued)

*Primary Examiner* — Mohamed Charioui
(74) *Attorney, Agent, or Firm* — NEO IP

(57) ABSTRACT

The present invention is directed to a system and method of tracking individuals and/or objects in a game location using sensor fusion of both active and passive tracking systems. The invention includes a server platform receiving data from both the active and passive tracking systems, and a mobile application able to interface with and/or visualize the received data. By combining data from both the active and passive tracking systems, the system is able to visually track objects and/or individuals in the location using the passive tracking system, and correlate and identify those objects with known individuals and/or objects based on location data generated by the active tracking system. The mobile application is able to both selectively modulate sampling rates for the active tracking system for specific individuals and/or objects and also to label and identify individuals and/or objects on the passive tracking system where the active tracking system is unavailable.

18 Claims, 4 Drawing Sheets

100

(56) References Cited

U.S. PATENT DOCUMENTS

| | | |
|---|---|---|
| 11,016,188 B2 | 5/2021 | Johnson |
| 11,022,690 B2 | 6/2021 | Cavallaro et al. |
| 11,123,605 B1 | 9/2021 | Marty |
| 11,157,742 B2 | 10/2021 | Zhang et al. |
| 11,188,759 B2 | 11/2021 | Elder et al. |
| 11,257,224 B2 | 2/2022 | Hiroi et al. |
| 11,557,044 B2* | 1/2023 | Forsgren ................... G06T 7/97 |
| 11,904,244 B1* | 2/2024 | Pierce ..................... A63F 13/27 |
| 2010/0026809 A1* | 2/2010 | Curry ................... H04N 23/698 |
| | | 348/157 |
| 2016/0306036 A1 | 10/2016 | Johnson |
| 2019/0304216 A1* | 10/2019 | Mendelson ............. G06F 1/163 |
| 2021/0287336 A1 | 9/2021 | Piadyk et al. |
| 2022/0345934 A1* | 10/2022 | Kim ....................... H04W 4/40 |

\* cited by examiner

SENSOR FUSION SYSTEM FOR TRACKING PERSONS AND OBJECTS

BACKGROUND OF THE INVENTION

1. Field of the Invention

The present invention relates to sensor fusion systems, and more specifically to sensor fusion for tracking individuals and objects with both active and passing tracking systems, especially in sports game environments.

2. Description of the Prior Art

It is generally known in the prior art to provide tracking of players using individual sensor types, including infrared sensors and accelerometers.

Prior art patent documents include the following:

U.S. Pat. No. 10,754,025 for Radar and camera-based data fusion by inventors Asghar et al., filed Jun. 20, 2018 and issued Aug. 25, 2020, discloses a method including detecting an object within a field of view of a radar using a radar signal; tracking movement of the object through the field of view of the radar; triggering a camera to capture a plurality of images of the object based on the movement of the object; detecting the object in the plurality of images; combining data of the radar signal with data of the camera to estimate a position of the object; identifying a radar signal track generated by the motion of the object based on the combined data; and estimating a trajectory of the object based on identifying the radar signal track.

U.S. Pat. No. 11,016,188 for Systems to track a moving sports object by inventor Johnson, filed Mar. 13, 2019 and issued May 25, 2021, discloses systems, methods and computer-readable media for tracking a moving sports object. In one example, a method of tracking a moving sports object includes calibrating a perspective of an image of a camera to a perspective of a Doppler radar for simultaneous tracking of the moving sports object, and tracking the moving sports object simultaneously with the camera and Doppler radar. The method may further comprise removing offsets or minimizing differences between simultaneous camera measurements and Doppler radar measurements of the moving sports object. The method may also include combining a camera measurement of an angular position of the moving sports object with a simultaneous Doppler measurement of a radial distance, speed or other measurement of the moving sports object.

U.S. Pat. No. 11,123,605 for Systems and methods for monitoring basketball shots by inventor Marty, filed Dec. 1, 2016 and issued Sep. 21, 2021, discloses methods and apparatuses related to monitoring basketballs. In particular, a system for monitoring basketballs may include at least one non-intrusive sensor for sensing motion of a basketball during a missed basketball shot as the basketball travels along a rebound flight path from a basketball goal. The system may also include at least one processor configured to i) generate, based on the sensed motion, trajectory parameters that characterize one or more states of the basketball along the rebound flight path and ii) generate feedback information using the trajectory parameters. The system may further include at least one feedback output mechanism for providing the feedback information to a user.

US Patent Pub. No. 2021/0287336 for Tracking sparse objects and people in large scale environments by inventors Piadyk et al., filed Mar. 16, 2021 and published Sep. 16, 2021, discloses a modular tracking system comprising the network of independent tracking units optionally accompanied by a LIDAR scanner and/or (one or more) elevated cameras. Tracking units are combining panoramic and zoomed cameras to imitate the working principle of the human eye. Markerless computer vision algorithms are executed directly on the units and provide feedback to motorized mirror placed in front of the zoomed camera to keep tracked objects/people in its field of view. Microphones are used to detect and localize sound events. Inference from different sensor is fused in real time to reconstruct high-level events and full skeleton representation for each participant.

U.S. Pat. No. 11,257,224 for Object Tracker, Object Tracking Method, And Computer Program by inventors Hiroi et al., filed Mar. 4, 2019 and issued Feb. 22, 2022, discloses an object tracking apparatus that realizes robust object detection and tracking even for movement fluctuation and observation noise, an object tracking method, and a computer program. An object cracking apparatus 1 is an apparatus tracking an object in video, the object tracking apparatus 1 including: a deep learning discriminator 2 which is a discriminator by deep learning; and a particle filter function unit 3 tracking an object by applying a multi-channel feature value of video including feature values by the deep learning discriminator 2 to likelihood evaluation by a particle filter, according to a distance between position information about the multi-channel feature value and position information about each particle.

U.S. Pat. No. 10,989,519 for Estimating tracking sensor parametrization using known surface constraints by inventors Labbe et al., filed Jun. 11, 2020 and issued Apr. 27, 2021, discloses a sensor system and a method of operating a sensor system including a plurality of sensors tracking a moving object in an area having known bounding surfaces. The apparatus and method calculate a time-specific position of the object based on data and sensor parameters from at least two of the plurality of sensors and determine errors between the calculated time-specific positions calculated. The method and apparatus calculate a minimum system error attributable to the at least two sensors by constraining at least one dimension in the data of the sensor used in the calculated time-specific position of the object associated with the sensor, the constraining based on an object/surface interaction, the minimum system error calculated by solving for modified sensor parameters for each sensor.

U.S. Pat. No. 11,157,742 for Methods and systems for multiplayer tagging for ball game analytics generation with a mobile computing device by inventors Zhang et al., filed Sep. 1, 2020 and issued Oct. 26, 2021, discloses methods and systems for image clustering, including determining a plurality of images from a video of a game, the video captured by a camera on a mobile device, where at least one image of the plurality of images is segmented from a video frame of the video; determining a feature vector from the at least one image; dividing the images into a first subset and a second subset based on the feature vector; tagging a first player in a first image of the first subset with an identifier, where the identifier differentiates the images in the first subset to a plurality of players; and identifying a second player in a second image in the second subset by propagating the identifier of the first subset, based on a distance measure associated with the feature vector. Running on a mobile computing device, this invention allows multiplayer tagging to be easily performed in almost any environment.

U.S. Pat. No. 11,188,759 for System and method for automated video processing of an input video signal using tracking of a single moveable bilaterally-targeted game-object by inventors Elder et al., filed Jan. 2, 2020 and issued Nov. 30, 2021, discloses a system and method for automated video processing of an input video signal using tracking of a single moveable bilaterally-targeted game-object involved in a team-based sporting event. The method includes: receiving the input video signal; analyzing the input video signal for one or more contextual feature maps; coding the one or more contextual feature maps; using a trained machine learning model, determining estimated coordinates of the single moveable bilaterally-targeted game-object for each group of one or more frames of the input video signal, the machine learning model receiving the coded one or more contextual feature maps as features to the machine learning model, the machine learning model trained using training data including a plurality of previously recorded training video signals each with associated coded one or more contextual feature maps, the training data further including ground truth data including screen coordinates of the single moveable bilaterally-targeted game-object.

U.S. Pat. No. 9,734,405 for Systems and methods for monitoring objects in athletic playing spaces by inventors Marty et al., filed Oct. 5, 2015 and issued Aug. 15, 2017, discloses a system using a camera, a depth sensor, and a processing module to track a moving object in an athletic playing space over time. The processing module receives image frames from the camera and depth data from the depth sensor. The processing module analyzes the depth data to identify which of the pixels are in a plane of a sufficiently large size to indicate that the identified pixels correspond to a playing surface of the athletic playing space. The processing module then determines that gravity is in a direction normal to the identified plane. By finding the direction of gravity within the images, the algorithm for calculating performance parameters based on the trajectory of a moving object within the athletic playing space can be greatly simplified, thereby decreasing the processing burdens associated with calculating the performance parameters and providing more accurate trajectory estimations with fewer measured trajectory points.

U.S. Pat. No. 10,994,172 for Systems and methods for integrated automated sports data collection and analytics platform by inventor Hall, filed Nov. 7, 2019 and issued May 4, 2021, discloses systems, methods, and apparatus for data analytics for a sports activity. A multiplicity of sensors tracks a multiplicity of world objects related to the sports activity, collects and communicates tracking data to a server platform in real time or near real time. The server platform integrates the tracking data from the multiplicity of sensors and scoring data for the sports activity, and correlates the tracking data and the scoring data with a corresponding UTC timecode based on rules related to the sports activity, thereby creating a multiplicity of UTC-coded data sets. The server platform synchronizes the multiplicity of UTC-coded data sets, thereby creating a time-synchronized data set. The server platform provides analytics based on the time-synchronized data set, thereby creating analyzed data. The multiplicity of user devices displays the analyzed data based on at least one application program.

US Patent Pub. No. 2016/0306036 for Systems and methods to track a golf ball to and on a putting green by inventor Johnson, filed Dec. 3, 2014 and published Oct. 20, 2016, discloses systems, methods and media to track a golf ball to and on a green. In an example embodiment, a method comprises arranging golf ball tracking components including a 3-D tracking Doppler radar, and at least one camera adjacent the green, and connecting a processor with signal sampling capability to the tracking components. The positions and orientations of the tracking components relative to a location in the green, for example the pin hole, are entered into the processor. In one example, microphones are provided. The tracking radar detects a golf ball approaching the green and the microphones detect the landing. The processor calculates the landing position of the ball based on signals received from the radar, the microphones, or the at least one camera. The camera records images of the ball on the green and the processor processes the images of the ball to construct a composite difference image of ball positions and movement on the green, and uses the composite difference image to determine a final position of the ball on the green.

U.S. Pat. No. 10,922,871 for Casting a ray projection from a perspective view by inventors Xue et al., filed Dec. 10, 2018 and issued Feb. 16, 2021, discloses a device, system, and method casting a ray projection from a perspective view. The method includes determining a first mask for a first object from a first frame captured by a first camera. The method includes determining a second mask for the first object from a second frame captured by a second camera. The method includes generating a 3D mask by associating the first mask and the second mask. The method includes determining a location of the 3D mask. The method includes generating the ray projection of the 3D mask from a perspective of a second object.

U.S. Pat. No. 11,022,690 for Tracking system by inventors Cavallaro et al., filed Apr. 2, 2020 and issued Jun. 1, 2021, discloses a system simultaneously tracking multiple objects. All or a subset of the objects includes a wireless receiver and a transmitter for providing an output. The system includes one or more wireless transmitters that send commands to the wireless receivers of the multiple objects instructing different subsets of the multiple objects to output (via their respective transmitter) at different times. The system also includes object sensors that receive output from the transmitters of the multiple objects and a computer system in communication with the object sensors. The computer system calculates locations of the multiple objects based on the sensed output from the multiple objects.

SUMMARY OF THE INVENTION

The present invention relates to sensor fusion systems, and more specifically to sensor fusion for tracking individuals and objects with both active and passing tracking systems, especially in sports game environments.

It is an object of this invention to utilize of plurality of different types of sensors and tracking systems for following players and objects over time, such that a first type of sensor data is able to substitute for a second type of sensor data if the first type of sensor data fails to be transmitted or is inadequate. It is further an object of this invention to provide a system allowing a user to adjust the sampling rates of one or more of the sensor types for specific objects or classes of objects.

In one embodiment, the present invention is directed to a system for tracking people and objects using a multiplicity of types of sensors, including at least one server, including a processor and a database, a plurality of active tracking devices, each attached to one of a plurality of a game components, at least one passive tracking system configured to generate a real-time feed for a game location, wherein the plurality of active tracking devices are each configured to transmit signals at one or more predefined intervals, wherein one or more receivers are configured to receive the signals transmitted by the plurality of active tracking devices, wherein the signals indicate a location of each active tracking device sending the signals, wherein the at least one server receives the real-time feed from the at least one passive tracking system and signal data from the one or more receivers, wherein the at least one server is configured to automatically mark the signal data with metadata indicating which of the plurality of active tracking devices sent each signal, wherein the at least one server is configured to detect one or more objects in the real-time feed and generate location data for each object, and wherein the at least one server is configured to automatically associate the signal data with the one or more detected objects by matching the location of the signal data with the location data generated from the real-time feed.

In another embodiment, the present invention is directed to a method for tracking people and objects using a multiplicity of types of sensors, including providing at least one server, including a processor and a database, and a plurality of active tracking devices, each attached to one of a plurality of a game components, at least one passive tracking system generating a real-time feed for a game location, the plurality of active tracking devices each transmitting signals at one or more predefined intervals, one or more receivers receiving the signals transmitted by the plurality of active tracking devices, the signals indicating a location of each active tracking device sending the signals, the at least one server receiving the real-time feed from the at least one passive tracking system and signal data from the one or more receivers, the at least one server automatically marking the signal data with metadata indicating which of the plurality of active tracking devices sent each signal, the at least one server detecting one or more objects in the real-time feed and generating location data for each object, and the at least one server automatically associating the signal data with the one or more detected objects by matching the location of the signal data with the location data generated from the real-time feed. In yet another embodiment, the present invention is directed to a system for tracking people and objects using a multiplicity of types of sensors, including at least one server, including a processor and a database, a plurality of active tracking devices, each attached to one of a plurality of a game components, wherein the plurality of active tracking devices are each configured to transmit signals at one or more predefined intervals, wherein one or more receivers are configured to receive the signals transmitted by the plurality of active tracking devices, wherein the signals indicate a location of each active tracking device sending the signals, wherein the at least one server receives signal data from the one or more receivers, wherein the at least one server is configured to automatically mark the signal data with metadata indicating which of the plurality of active tracking devices sent each signal, and wherein the at least one server is configured to receive a selection to adjust a sampling rate and/or a sampling timing for one or more of the plurality of active tracking devices, and wherein the at least one server is configured to automatically transmit a message to the one or more of the plurality of active tracking devices, causing an adjustment of the one or more predetermined intervals at which the signals are sent for the one or more of the plurality of active tracking devices.

These and other aspects of the present invention will become apparent to those skilled in the art after a reading of the following description of the preferred embodiment when considered with the drawings, as they support the claimed invention.

DETAILED DESCRIPTION

Figure 1:
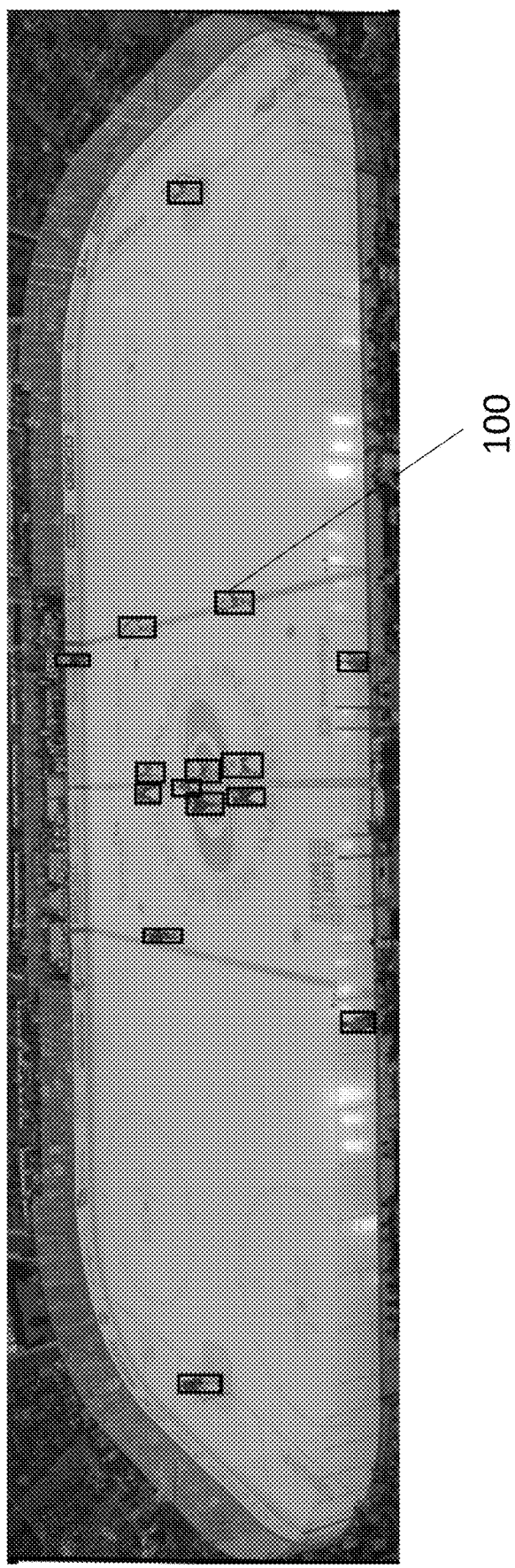
FIG. 1 illustrates an image including computer vision detection and tracking of a plurality of individuals on a hockey rink according to one embodiment of the present invention.

The present invention is generally directed to sensor fusion systems, and more specifically to sensor fusion for tracking individuals and objects with both active and passing tracking systems, especially in sports game environments.

In one embodiment, the present invention is directed to a system for tracking people and objects using a multiplicity of types of sensors, including at least one server, including a processor and a database, a plurality of active tracking devices, each attached to one of a plurality of a game components, at least one passive tracking system configured to generate a real-time feed for a game location, wherein the plurality of active tracking devices are each configured to transmit signals at one or more predefined intervals, wherein one or more receivers are configured to receive the signals transmitted by the plurality of active tracking devices, wherein the signals indicate a location of each active tracking device sending the signals, wherein the at least one server receives the real-time feed from the at least one passive tracking system and signal data from the one or more receivers, wherein the at least one server is configured to automatically mark the signal data with metadata indicating which of the plurality of active tracking devices sent each signal, wherein the at least one server is configured to detect one or more objects in the real-time feed and generate location data for each object, and wherein the at least one server is configured to automatically associate the signal data with the one or more detected objects by matching the location of the signal data with the location data generated from the real-time feed.

In another embodiment, the present invention is directed to a method for tracking people and objects using a multiplicity of types of sensors, including providing at least one server, including a processor and a database, and a plurality of active tracking devices, each attached to one of a plurality of a game components, at least one passive tracking system generating a real-time feed for a game location, the plurality of active tracking devices each transmitting signals at one or more predefined intervals, one or more receivers receiving the signals transmitted by the plurality of active tracking devices, the signals indicating a location of each active tracking device sending the signals, the at least one server receiving the real-time feed from the at least one passive tracking system and signal data from the one or more receivers, the at least one server automatically marking the signal data with metadata indicating which of the plurality of active tracking devices sent each signal, the at least one server detecting one or more objects in the real-time feed and generating location data for each object, and the at least one server automatically associating the signal data with the one or more detected objects by matching the location of the signal data with the location data generated from the real-time feed.

In yet another embodiment, the present invention is directed to a system for tracking people and objects using a multiplicity of types of sensors, including at least one server, including a processor and a database, a plurality of active tracking devices, each attached to one of a plurality of a game components, wherein the plurality of active tracking devices are each configured to transmit signals at one or more predefined intervals, wherein one or more receivers are configured to receive the signals transmitted by the plurality of active tracking devices, wherein the signals indicate a location of each active tracking device sending the signals, wherein the at least one server receives signal data from the one or more receivers, wherein the at least one server is configured to automatically mark the signal data with metadata indicating which of the plurality of active tracking devices sent each signal, and wherein the at least one server is configured to receive a selection to adjust a sampling rate and/or a sampling timing for one or more of the plurality of active tracking devices, and wherein the at least one server is configured to automatically transmit a message to the one or more of the plurality of active tracking devices, causing an adjustment of the one or more predetermined intervals at which the signals are sent for the one or more of the plurality of active tracking devices.

Improving visualization, graphics, and live stats is a focus of improvement for sports broadcasts in order to improve the experience of viewers and provide more effective entertainment. One important facet for increasing viewer engagement requires tracking players or game objects (e.g., the ball, the puck, etc.) either to be able to automatically focus the camera on a key player or area, or to track statistics such as possession, total distance traveled, or other stats.

Recent inventions have focused on using a single form of active tracking methodology in order to track players. Active tracking methods are those that rely on items attached to the objects or people being tracked, and which transmit data that is received by an external detector or server. Inventions have previously captured this data with a single method, such as tracking accelerometer data transmitted wireless through ultra-wide band (UWB) detectors, such as is described in U.S. Pat. No. 11,023,303, which is incorporated herein by reference in its entirety, or through infrared signals with pulses synchronized to the shutter of an infrared camera, as disclosed in U.S. Pat. No. 11,022,690, which is incorporated herein by reference in its entirety. However, using a single tracking method, especially a tracking method dependent on tags applied to individual players, or use of specific game objects, is not ideal.

First, using only active tracking methods is subject to human error, including failure to properly apply tags to players, or to put the correct game objects into play (e.g., a puck including an infrared transmitter versus a traditional puck). While it is often possible to backfill the data missed by these mistakes and correct statistics, this backfill process often requires manually tracing the movement of a player or object over a period of time, which is frequently a time consuming and inexact process. Furthermore, this backfill itself is sometimes disrupted if the game footage does not sufficiently include the player or object being tracked in frame during the time period. Additionally, any method of backfill inherently does not correct the issue in real time, meaning real-time statistics are not able to be gathered or used to visually track players if this mistake is made.

Furthermore, some active tracking methods are inherently limited in their capabilities. For example, using accelerometer data transmitted through UWB is able to provide adequate tracking of a player, but this information is unable to be sampled at a sufficiently high rate or transmitted quickly enough to use it for real-time uses. For example, this tracking method is unable to support the use of live statistics, or for using the tracking data to affect camera movement fixated on a single game object or player. On the other hand, even methods that are capable of such real-time imaging, such as the infrared system described in U.S. Pat. No. 11,022,690 have limitations. That method uses a set number of infrared camera shutters per second (e.g., 300) with infrared trackers on specific people or objects only set to transmit infrared signals at specific time intervals, synchronized with the shutter speed of the infrared camera. Therefore, the infrared camera in the '690 patent is able to focus on only a single object for each shutter opening. However, this method is limited, as it requires allocating a specific number of shutters to each object (e.g., 60 per second for the puck, 12-14 per second for each active player, 1 per second for each bench player). Increasing the sample rate for an individual object, therefore, comes at the expense of decreasing the sample rate for other objects. Therefore, if the allocation for the puck, for example, is increased to 100 samples per second, then the sample rate for each player plummets, which is often unacceptable. Therefore, it is needed to have a system with redundancy for tracking individual people or objects, so as to allow the active tracking system to reallocate a higher sampling rate for other people or objects without losing data.

Other systems, such as that described in U.S. Pat. No. 11,188,759, which is incorporated herein by reference in its entirety, utilize only "passive systems" for detecting game objects. These systems use cameras to passively detect players or game objects, (e.g., pucks) and to attempt to form an idea of coordinates of the each player or game object, such that their paths are able to be tracked. However, sole reliance on visual systems tends to make the systems particularly vulnerable to visual occlusions and are limited in the maximum sampling rate that they are able to gather. Specifically, cameras are limited by their sampling rate, which is typically limited to 60 frames per second or less. Moreover, these systems do not identify which players correspond to each tracked visual element, but only track the locations of visual elements, therefore lacking some of the capabilities of active tracking systems. Therefore, if stakeholders wish to increase the sampling rate for a particular game element (e.g., the puck) to higher than 60 samples per second, then the passive system alone is inadequate.

Referring now to the drawings in general, the illustrations are for the purpose of describing one or more preferred embodiments of the invention and are not intended to limit the invention thereto.

The present invention is directed to a system including both active and passive tracking systems, including sensor fusion between the active and passive tracking systems. In one embodiment, the system includes an adjustable sampling rate for the active tracking system, with decreases in active sampling rate for particular objects being automatically backfilled by passive tracking data. By fusing the active and passive tracking systems of the present invention, the system is able to both track a plurality of people and game objects, and to identify each of the people and objects being tracked.

In one embodiment, the active tracking system includes one or more tags attached externally to clothing and/or equipment worn, equipped, or held by a plurality of individuals. In one embodiment, the tags are attached to the clothing and/or equipment via adhesive, nuts and bolts, screws, hook and loop fasteners, and/or any other conventional attachment method. In another embodiment, the active tracking system includes one or more tags included internally in clothing and/or equipment worn, equipped, or held by the plurality of individuals. In one embodiment, the tags are interwoven into fabric worn by the user, attached adhesively to the inside surface of the clothing or equipment, or attached through any other conventional means.

In one embodiment, the active tracking system included in the present system includes at least one infrared-emitting tag attached to one or more people (e.g., game players, referees, audience members, coaches, cameramen, other staff, etc.) and/or one or more game objects (e.g., pucks, balls, shufflecocks, curling stones, etc.). In one embodiment, the game object is a puck including internal electronics operable to emit infrared signals as discussed, for example, in U.S. Pat. No. 10,343,042, which is incorporated herein by reference in its entirety, and/or a ball including internal electronics and emitting infrared signals. The infrared-emitting tags are each configured to emit infrared signals, in the form of continuous wave infrared bursts, detectable by one or more infrared cameras at predetermined time intervals. The one or more infrared cameras on the other hand, are configured to open shutters to expose the camera and detect the infrared signals multiple times per second. After detecting the infrared signals from the tags, the one or more infrared cameras transmit the image data to a central server. The central server is then able to determine a three-dimensional position data for the person or object attached to each of the infrared tags. In one embodiment, the system includes multiple infrared cameras, and the central server is capable of determining three-dimensional position data using triangulation from these multiple infrared cameras. In another embodiment, the system determines depth of the object based on the intensity of the received infrared signal, which is combined with the x-y position (from the infrared camera's perspective) of the image data, thereby allowing for three-dimensional position data to be determined using a single camera.

Infrared cameras are still limited in the number of types they are able to open and close the shutter per second while still effectively acquiring image data. In one embodiment, the one or more infrared cameras used in the present invention have a shutter speed of approximately 300 Hz. In one embodiment, in order to obtain the identity of the tagged people or objects and to more accurately obtain position data, the infrared tags are programmed such that only the at least one infrared tag attached to a particular individual or object emits infrared signals at any one time. In order to ensure these signals are actually acquired by the one or more infrared cameras, the infrared signals are synchronized such that infrared signals are being transmitted from the at least one infrared tag at the same time that the shutters are opened. Infrared tags corresponding to each individual and/or object are allocated a specific number of shutters per second, preferably adding up to approximately the maximum shutter speed (e.g., 300 total frames per second). By way of example and not limitation, in one embodiment involving a hockey game, the one or more infrared cameras detect an infrared-emitting puck 60 times per second, detect each player actively on the rink 12-15 times per second, detects each referee and linesman on the rink 12 times per second, detects each coach 3 times per second, and detect each player on the bench 1 time per second, for approximately 300 total frames per second.

In one embodiment, for individuals or objects detected multiple times per second, the frames used to detect each particular individual or object are divided over the course of the second (e.g., a first individual is scanned at frames 2, 16, 105, 200). In another embodiment, for individuals or objects scanned at multiple times per second, frames used to detect each particular individual or object are clustered (e.g., a first individual is scanned at frames 16, 17, 18, 19, 20). Because the time in which the at least one infrared tag attached to each particular individual or object transmits signals is known, the central server is able to identify which infrared signals correspond to which individuals or objects during processing.

In one embodiment, in addition to or in alternative to the at least one infrared tag, the active tracking system includes at least one accelerometer attached to each individual and/or object being tracked. The at least one accelerometer generates position data regarding the orientation of each individual and/or object. Importantly, the at least one accelerometer needs to be attached to a consistent location on the individual (e.g., on the shoulder) or on the object to provide reliable orientation. Advantageously, the at least one accelerometer is able to be used to produce not only position data, but also movement orientation data, determining a direction of movement of the individual and/or object at each time point. In one embodiment, the at least one accelerometer transmits telemetry data, including position data and/or movement orientation data, to an ultra-wide band (UWB) receiver. In one embodiment, the UWB receiver receives telemetry data from the at least one accelerometer at a sampling rate of approximately 60 Hz. In one embodiment, the telemetry data includes metadata identifying which of the at least one accelerometer is transmitting each data packet and/or a time point associated with each transmission, such that an identity of each individual and/or object is able to be associated with the telemetry data. Unlike the infrared camera, the UWB receiver is able to receive data from all of the at least one accelerometer at the maximum sampling rate (e.g., 60 Hz), rather than having to receive telemetry data from specific accelerometers at specific time intervals, as with the infrared tags. The UWB receivers then transmit the telemetry data from each of the at least one accelerometer to the central server for processing. In one embodiment, each venue location (e.g., each stadium) includes three UWB receivers, and the data is reconciled at the central server. In one embodiment, the data reconciliation includes averaging the data received at each time point for each individual and/or object from each server. In another embodiment, the data reconciliation includes selecting data corresponding to the first data for each time point and for each individual and/or object received (i.e., UWB receiver 1 transmits data to the central data for a position at time point 11:25:01 at time 11:25:03, while UWB receivers 2 and 3 transmits data corresponding to the same time point milliseconds later, and the central server selects the UWB receiver 1 as having been received first).

FIG. 1 illustrates an image including computer vision detection and tracking of a plurality of individuals on a hockey rink according to one embodiment of the present invention. The system includes at least one passive tracking system. The at least one passive tracking system includes at least one camera. In one embodiment, the at least one passive tracking system includes at least one LiDAR sensor. In one embodiment, the at least one camera and/or at least one LiDAR sensor automatically transmits image and video data (in the case of the camera) and/or point cloud data (in the case of the LiDAR sensor) to the central server. In one embodiment, the at least one camera is set at a static location (e.g., a consistent aerial view over a stadium, field, track, rink, court, etc.) and is calibrated with one or more static images of the location. In one embodiment, calibration includes generating a background model. In one embodiment, generating the background model includes generating a variety of models accounting for changes in lighting or shadows in the environment. In one embodiment, the central server of the system utilizers temporal average filtering of the one or more static images to train the central server to model the location in a robust variety of lighting condition or a robust variety of common background states of the location (e.g., rink doors opening and closing for a hockey rink). In one embodiment, each time the location is changed (e.g., repainted, new sponsor images added, logo changes, etc.), the at least one camera is recalibrated with one or more new images of the location. In one embodiment, the central server automatically indicates differences between the static image of the location and the current image, indicating items (i.e., individuals, game objects, etc.) in the image. In one embodiment, the central server automatically generates position data for each item in view. Because the central server is identifying objects differing from an empty environment, the visual analysis provided by the passive tracking system alone does not identify the people and/or objects detected, but is able to be used to track those people or items and determine their locations and paths over time.

FIG. 1 provides a visualization for how the computer vision system employed by the central server detects boundaries 100 of separate objects. In one embodiment, the central server only defines differences between the calibration image of the location and the current image as objects or people in the environment if the size of the differences is above a minimum threshold. Advantageously, this reduces the chance of treating artifacts in the image as objects. However, it also means that for many embodiments of the at least one camera, including those embodiments where the at least one camera is at a distance (e.g., filming from a far upper vantage), tracking the puck with the at least one camera alone, using solely the blob detection system described above, is difficult.

One of ordinary skill in the art will understand that the system is not limited to embodiments wherein processing (e.g., computer vision identification) occurs entirely at the central server. In one embodiment, processing of the data received by the at least one camera is performed at a distributed network of servers and the processed data is transmitted to the central server. In another embodiment, some or all processing is performed at the at least one camera itself, and the system, in this embodiment, is therefore based on an edge computing paradigm.

Figure 2:
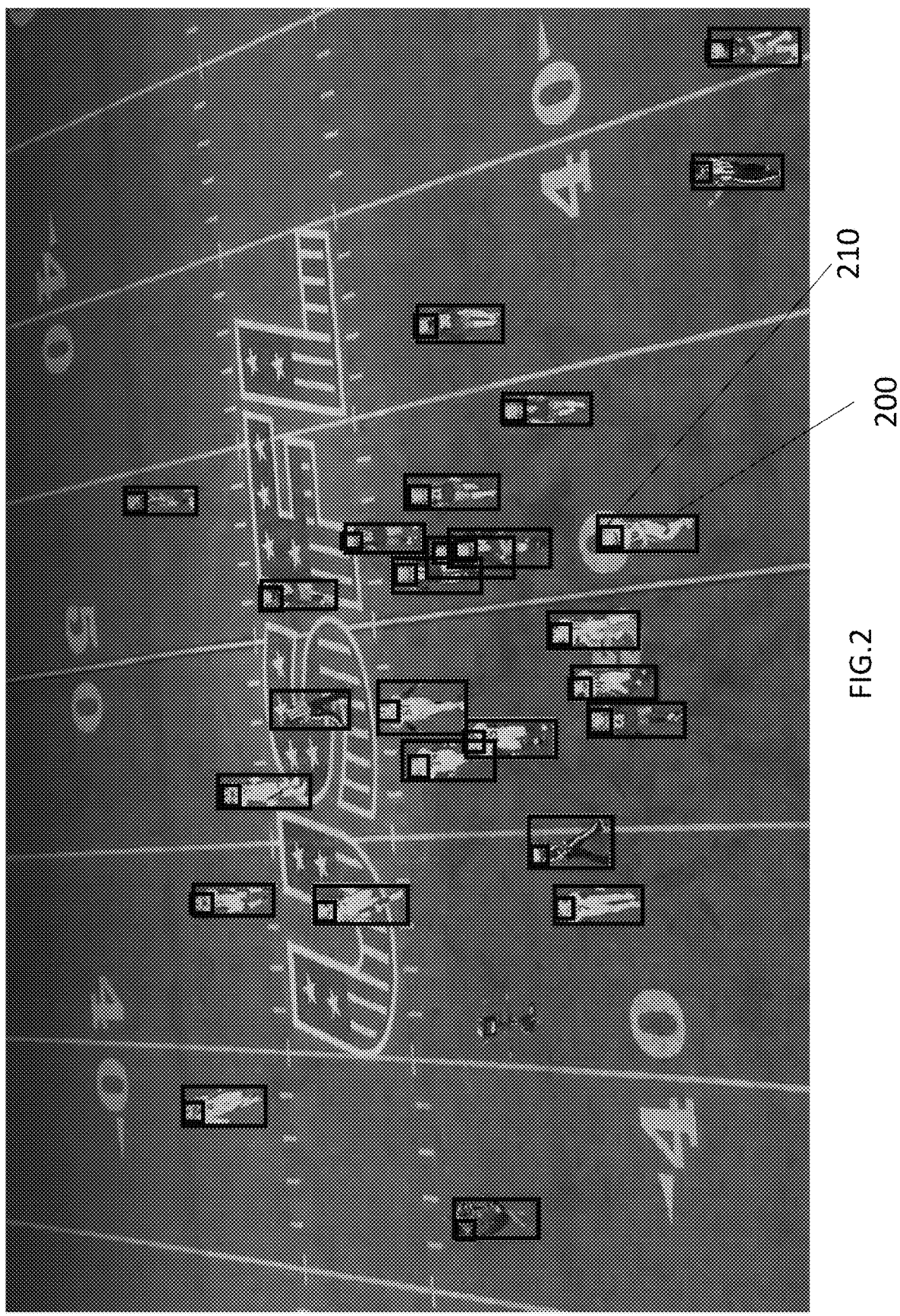
FIG. 2 illustrates an image including neural-network enhanced computer vision detection and tracking of a plurality of individuals on a football field according to one embodiment of the present invention.

FIG. 2 illustrates an image including neural-network enhanced computer vision detection and tracking of a plurality of individuals on a football field according to one embodiment of the present invention.

In one embodiment, the computer vision system of the central server uses machine learning or artificial intelligence module to detect and track each object and/or individual in the location. In one embodiment, the machine learning or artificial intelligence module includes the use of neural networks. In one embodiment, the computer vision system is trained using prior game footage from the location in order to recognize common shapes of identifying objects and individuals (i.e., what an individual looks like) and/or where identifiable subcomponents of each objects and/or individual are located relative to the object or individual as a whole. In one embodiment, based on training through a neural network, the computer vision system is able to identify and separate individuals from other objects in the field view. In one embodiment, the computer vision system is able to automatically identify the head of each identified individual in the location. In one embodiment, the computer vision system is able to identify an orientation of each individual (i.e., which direction each individual is facing). In one embodiment, the computer vision system is trained with respect to multiple different teams to develop color models. In one embodiment, the computer vision system is therefore capable of determining which team each identified player plays for.

In one embodiment, the system includes a plurality of cameras positioned at different positions and/or orientations with respect to the imaged location. The central server receives image data from each camera and automatically cross-correlates detected objects in one camera view with objects in another camera view. For example, a first camera detects a first individual at time point 1, while a second camera, from a different angle also detects a first individual at time point 1. The central camera determines that the first individual shown by the first camera is the same as the individual shown by the second camera. In one embodiment, the central server automatically determines a three-dimensional coordinate for the individual and/or objects detected by the plurality of cameras via triangulation. By generating a three-dimensional coordinate of the object, the central server is also able to determine a velocity of the object by analyzing the object with known optic flow techniques and determining the rate of movement of the object over time. In one embodiment, temporal smoothing techniques, including causal or non-causal temporal smoothing are performed in tracking the movement of each object to filter out high-frequency noise.

Advantageously relative to any prior art system, the system of the present invention provides sensor fusion between those sensors used in the active tracking system and the computer vision system of the passive tracking system. In one embodiment, where the active tracking system includes at least one infrared tag or emitter attached to or included in each tracked individual or object, at each time point, the central server determines coordinates for each individual and/or object based on the infrared sensor data and matches these coordinates to the three-dimensional coordinates determined via the computer vision system of the passive tracking system. Because the infrared sensor data gathered at each time point corresponds to signals emitted from a tag or emitter attached to a known individual or object, the computer vision system is then able to determine the specific identity of each tracked object or individual.

Similarly, in one embodiment, where the active tracking system includes at least one accelerometer attached to each tracked individual or included in each tracked object, at each time point, the central server determines coordinates for each individual and/or object and matches these coordinates with the three-dimensional coordinates determined via the computer vision system of the passive tracking system. Because the accelerometer data includes metadata unique to each tag (or infrared emitter) and which tag is applied to which individual and/or object is known, the computer vision system is then able to determine the specific identity of each tracked object or individual.

In one embodiment, the central server receives a selection to track a specific individual and/or object in a game (e.g., track a player playing in the forward position). In one embodiment, the central server communicates with at least one movable camera. Based on the coordinates of the selected specific individual and/or object, determined by the active tracking system and the passive tracking system, the at least one movable camera automatically follows and focuses on the selected individual and/or object. In this way, the system allows for improved highlighting of star players or of important plays during a game in real time, improving engagement with the broadcast. This provides an improved over manual methods of tracking specific players, which require additional operators and which is subject to human error.

One of ordinary skill in the art will understand that the system is not limited to using a single form of active tracking. In one embodiment, data from one or more infrared red emitters is used to produce position data for each individual and/or object and to provide the identity of each tracked individual and/or object, data from one or more accelerometers is used to produce orientation information for each individual and/or object and to determine the direction in which individual and/or object is moving, and the passive tracking system is used to identify coordinates for each individual and/or object and to backfill missing data from the one or more infrared emitters and/or the one or more accelerometers.

In one embodiment, the central server is in network communication with at least one user device. In one embodiment, the system includes a mobile application on the at least one user device (e.g., a computer, a tablet, a smartphone, a phablet, etc.). In one embodiment, where there are a limited numbers of frames per second that are selectively allocatable to tracking individual players or objects (e.g., the infrared camera shutter), the mobile application is operable to receive a selection of sampling rates for individual objects or players, and/or classes of objects or players. By way of example and not limitation, the mobile application receives a selection to change a sampling rate for a puck from 60 frames per second to 100 frames per second. In one embodiment, the mobile application will automatically decrease the sampling rate of other objects and individuals so as to maintain the total frames per second at or below the maximum frames per second of the system. In one embodiment, the mobile application includes a minimal threshold number of frames for one or more of the individuals or objects being tracked. If the adjustment to the sampling rate of one object or individual would cause the number of frames dedicated to another individual or object to fall below the minimum threshold, the adjustment is rejected or a warning and prompt for confirmation is transmitted to the at least one user device.

In one embodiment, the computer vision system automatically determines an identity for each detected object or individual being tracked based on correlation with coordinate position data received from the active tracking system. Determining this information at a first time point allows the object to continue to be tracked and associated with the identified individual or object, unless collision in the imaging from the passive tracking system prevents two or more of the objects from being separately identified, which has the potential of preventing the system from knowing which of the collided objects or individuals is which after the collided objects or individuals are separated. However, the chances of collisions preventing objects from being separately identified decreases greatly with more cameras able to more precisely pinpoint the position of each object or individual and with the use of the artificial intelligence module to identify specific forms. Thus, in one embodiment, if a selection is received to adjust the sampling rate for one or more objects during the middle of a game, and the adjustment causes the sampling rate to drop very low (e.g., one frame per second) or to zero, then the system is able to continue tracking the individual and/or object using solely the passive tracking system. This is useful not only in the event of a selection excluding one or more of the objects or individuals from being sampled by the active tracking system, but also if an infrared emitter on the objects or individuals falls off, malfunctions, or breaks.

In one embodiment, the mobile application is able to receive a selection to manually tag an identity of one or more identified objects or individuals, and/or to mark one or more identified objects as "not an object" (i.e., to exclude unintentional artifacts from the tracking system). This functionality is particularly useful in an instance where one individual or object is mistakenly never provided with an active tracking sensor (e.g., staff forgot to include the infrared tag on a player's equipment), but still provides an opportunity to account for the problem in real time and continue both tracking and identifying the object and/or individual.

Figure 3:
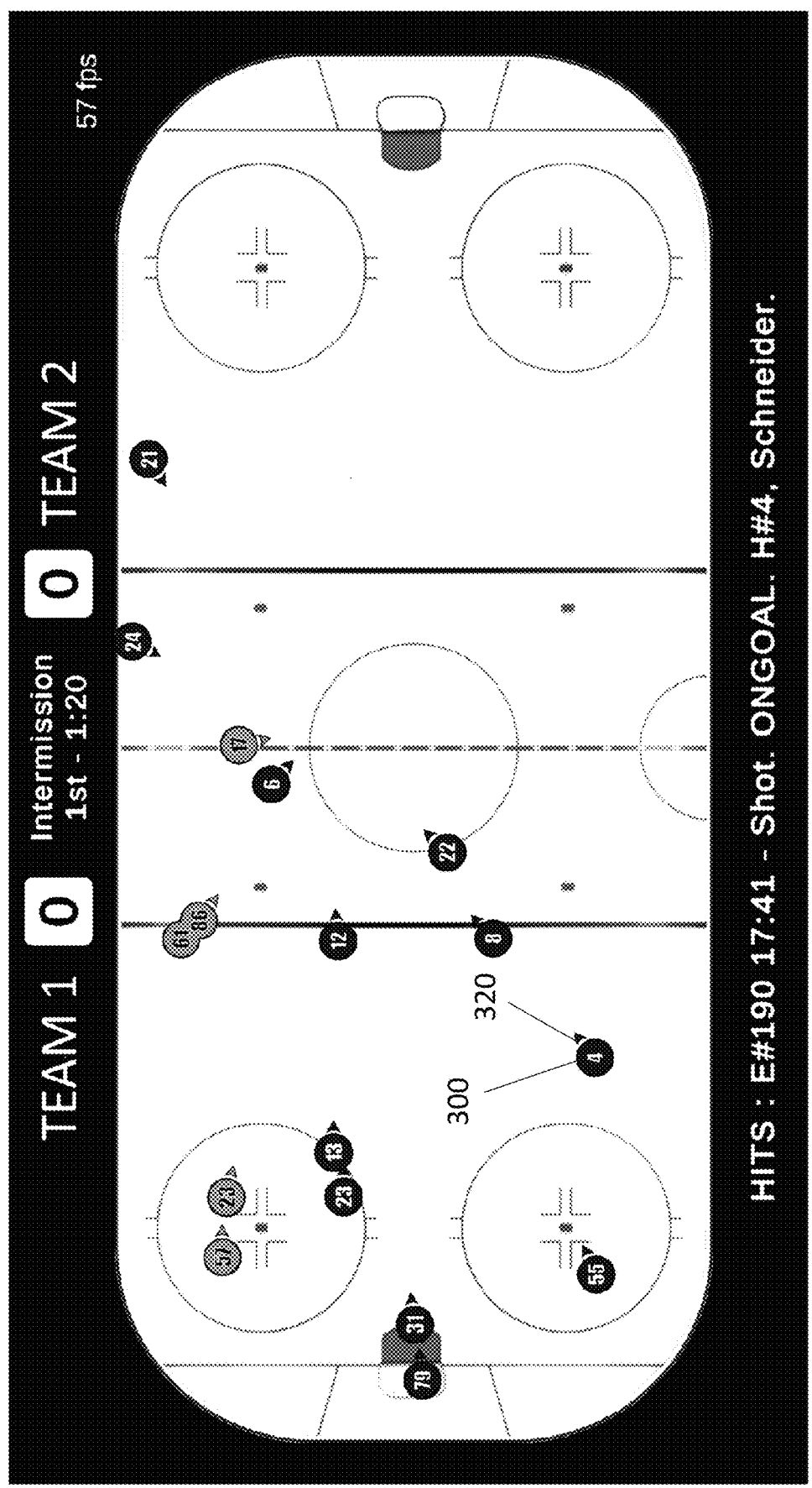
FIG. 3 illustrates a sprite application interface according to one embodiment of the present invention.

FIG. 3 illustrates a sprite application interface according to one embodiment of the present invention. In one embodiment, the central server transmits information to a plurality of user devices to populate a mobile application, including a virtual representation of the location (e.g., the field, the rink, the court, the stadium, etc.). A plurality of sprites 300 are overlayed on the virtual representation of the location. In one embodiment, the position of the plurality of sprites 300 is determined based on sensor data receiving from active tracking sensors (e.g., infrared tags, accelerometers, etc.) and/or coordinate data generated by the computer vision system of the passive tracking system, such that the location of the sprites 300 on the virtual representation of the location is consistently with the location of the individuals and/or objects on the actual location.

In one embodiment, the sprites 300 are paired with an arrow 320 positioned proximate to the sprite 300, indicating an orientation of the player represented by the adjacent sprite 300 (i.e., which direction the player is facing and/or moving). In one embodiment, the directionality of the arrow is based on active system tracking, such as accelerometer data transmitted via UWB. In one embodiment, the directionality of the arrow is based on passive system tracking, including computer vision detecting the direction in which the player is moving.

In one embodiment, sprites 300 are not only displayable in a mobile application, but also projectable onto an actual game location. For example, for a game occurring in California between a team from Los Angeles and a team from Detroit, fans of Detroit are able to gather in the Detroit stadium, with one or more overhead projectors displaying the sprites onto an actual game location (e.g., a field, a rink, a court, etc.) while game audio plays. This allows fans of away teams to better simulate the experience of attending the game in the stadium.

Figure 4:
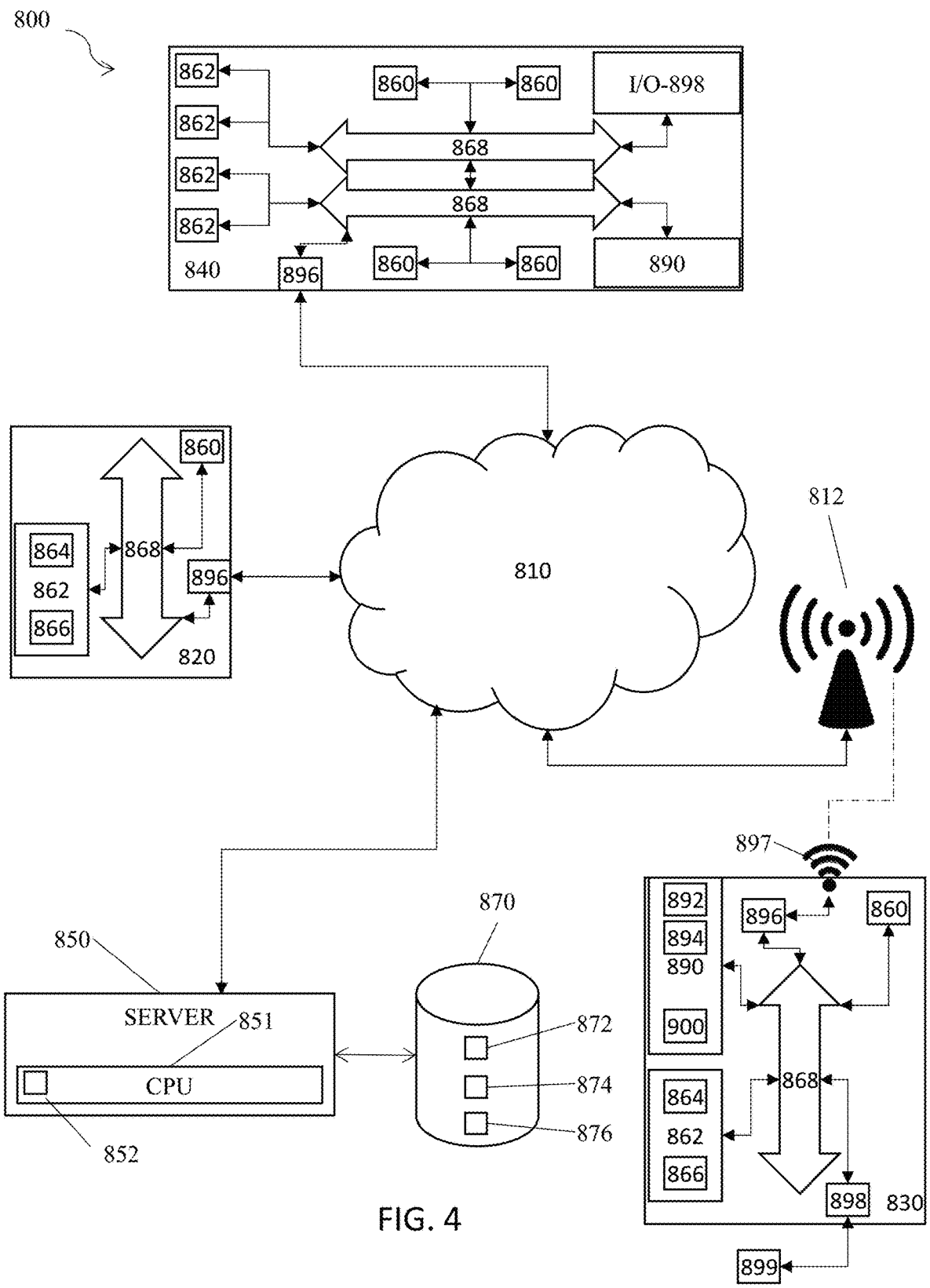
FIG. 4 is a schematic diagram of a system of the present invention.

FIG. 4 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 4, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 4, is operable to include other components that are not explicitly shown in FIG. 4, or is operable to utilize an architecture completely different than that shown in FIG. 4. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Location data is created in the present invention using one or more hardware and/or software components. By way of example and not limitation, location data is created using the Global Positioning System (GPS), low energy BLUETOOTH based systems such as beacons, wireless networks such as WIFI, Radio Frequency (RF) including RF Identification (RFID), Near Field Communication (NFC), magnetic positioning, and/or cellular triangulation. By way of example, location data is determined via an Internet Protocol (IP) address of a device connected to a wireless network. A wireless router is also operable to determine identities of devices connected to the wireless network through the router, and thus is operable to determine the locations of these devices through their presence in the connection range of the wireless router.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for tracking people and objects using a multiplicity of types of sensors, comprising:
at least one server, including a processor and a database;
a plurality of active tracking devices, each attached to one of a plurality of a game components;
at least one passive tracking system configured to generate a real-time feed for a game location;
wherein the plurality of active tracking devices are each configured to transmit signals at one or more predefined intervals;
wherein one or more receivers are configured to receive the signals transmitted by the plurality of active tracking devices, wherein the signals indicate a location of each active tracking device sending the signals;
wherein the at least one server receives the real-time feed from the at least one passive tracking system and signal data from the one or more receivers;
wherein the at least one server is configured to automatically mark the signal data with metadata indicating which of the plurality of active tracking devices sent each signal;
wherein the at least one server is configured to detect one or more objects in the real-time feed and generate location data for each object;
wherein the at least one server is configured to automatically associate the signal data with the one or more detected objects by matching the location of the signal data with the location data generated from the real-time feed; and
wherein the at least one server is configured to receive a selection to adjust a sampling rate and/or a sampling timing for one or more of the plurality of active tracking devices, wherein the at least one server is configured to automatically transmit a message to the one or more of the plurality of active tracking devices, causing an adjustment of the one or more predetermined intervals at which the signals are sent for the one or more of the plurality of active tracking devices, and wherein adjusting the sampling rate and/or the sampling timing for the one or more of the plurality of active tracking devices includes adjusting a number of camera shutters for detecting each of the one or more of the plurality of active tracking devices.

2. The system of claim 1, wherein the at least one passive tracking system includes one or more cameras and/or one or more LiDAR sensors.

3. The system of claim 1, wherein the signals transmitted by the plurality of active tracking devices include infrared (IR) light signals and/or ultra-wide band (UWB) radio signals.

4. The system of claim 1, wherein the plurality of game components includes players, coaches, referees, and/or hockey pucks.

5. The system of claim 1, wherein the at least one server detects the at least one object by comparing the real-time feed to at least one reference image of the game location.

6. The system of claim 1, wherein the signals include acceleration data and/or orientation data for the plurality of game components.

7. The system of claim 1, wherein the at least one server automatically generates a display graphic representing the game location and automatically updates sprites representing each game component on the display graphic in real time based on the association of the signal data with the one or more detected objects.

8. A method for tracking people and objects using a multiplicity of types of sensors, comprising:
providing at least one server, including a processor and a database, and a plurality of active tracking devices, each attached to one of a plurality of a game components;
at least one passive tracking system generating a real-time feed for a game location;
the plurality of active tracking devices each transmitting signals at one or more predefined intervals;
one or more receivers receiving the signals transmitted by the plurality of active tracking devices, the signals indicating a location of each active tracking device sending the signals;

the at least one server receiving the real-time feed from the at least one passive tracking system and signal data from the one or more receivers;

the at least one server automatically marking the signal data with metadata indicating which of the plurality of active tracking devices sent each signal;

the at least one server detecting one or more objects in the real-time feed and generating location data for each object;

the at least one server automatically associating the signal data with the one or more detected objects by matching the location of the signal data with the location data generated from the real-time feed; and the at least one server receiving a selection to adjust a sampling rate and/or a sampling timing for one or more of the plurality of active tracking devices, the at least one server automatically transmitting a message to the one or more of the plurality of active tracking devices, causing an adjustment of the one or more predetermined intervals at which the signals are sent for the one or more of the plurality of active tracking devices, wherein adjusting the sampling rate and/or the sampling timing for the one or more of the plurality of active tracking devices includes adjusting a number of camera shutters for detecting each of the one or more of the plurality of active tracking devices.

9. The method of claim 8, wherein the at least one passive tracking system includes one or more cameras and/or one or more LiDAR sensors.

10. The method of claim 8, wherein the signals transmitted by the plurality of active tracking devices include infrared (IR) light signals and/or ultra-wide band (UWB) radio signals.

11. The method of claim 8, wherein the plurality of game components includes players, coaches, referees, and/or hockey pucks.

12. The method of claim 8, further comprising the at least one server detecting the at least one object by comparing the real-time feed to at least one reference image of the game location.

13. The method of claim 8, wherein the signals include acceleration data and/or orientation data for the plurality of game components.

14. The method of claim 8, further comprising the at least one server automatically generating a display graphic representing the game location and automatically updating sprites representing each game component on the display graphic in real time based on the association of the signal data with the one or more detected objects.

15. A system for tracking people and objects using a multiplicity of types of sensors, comprising:

at least one server, including a processor and a database;

a plurality of active tracking devices, each attached to one of a plurality of a game components;

wherein the plurality of active tracking devices are each configured to transmit signals at one or more predefined intervals;

wherein one or more receivers are configured to receive the signals transmitted by the plurality of active tracking devices, wherein the signals indicate a location of each active tracking device sending the signals;

wherein the at least one server receives signal data from the one or more receivers;

wherein the at least one server is configured to automatically mark the signal data with metadata indicating which of the plurality of active tracking devices sent each signal; and wherein the at least one server is configured to receive a selection to adjust a sampling rate and/or a sampling timing for one or more of the plurality of active tracking devices, and wherein the at least one server is configured to automatically transmit a message to the one or more of the plurality of active tracking devices, causing an adjustment of the one or more predetermined intervals at which the signals are sent for the one or more of the plurality of active tracking devices; and wherein adjusting the sampling rate and/or the sampling timing for the one or more of the plurality of active tracking devices includes adjusting a number of camera shutters for detecting each of the one or more of the plurality of active tracking devices.

16. The system of claim 15, wherein upon receiving a selection to increase a sampling rate for one or more of the plurality of active tracking devices, the at least one server automatically rebalances sampling rates for each other active tracking device, such that the total sampling rate for the plurality of active tracking devices does not exceed a predetermined threshold.

17. The system of claim 15, wherein the signals transmitted by the plurality of active tracking devices include infrared (IR) light signals and/or ultra-wide band (UWB) radio signals.

18. The system of claim 15, wherein the signals include acceleration data and/or orientation data for the plurality of game components.

* * * * *